United States Patent Office 2,818,377
Patented Dec. 31, 1957

2,818,377

SEPARATION OF NICKEL FROM COBALT

Marcel De Merre, Hoboken-lez-Anvers, Belgium, assignor to Societe Generale Metallurgique de Hoboken, Hoboken-lez-Anvers, Belgium, a Belgian limited company No Drawing. Application October 30, 1956
Serial No. 619,132

Claims priority, application Great Britain August 27, 1956

3 Claims. (Cl. 204—92)

This invention relates to the separation of nickel from cobalt, both metals being contained in solution, preferably sulfate or chloride solution.

It is known that a separation of the two metals may be effected from such solutions, by the action of elemental sulfur or of sulfides at a high temperature and in the presence of a finely-divided metal, such as cobalt or of finely-divided cobalt alloys.

In such known processes, the nickel is precipitated together with a certain amount of cobalt in the form of a sulfide which is insoluble in mineral acids. For instance, when use is made of a primary solution containing the Ni and Co in a ratio of 10 Ni/100 Co, a solution is obtained on the one hand containing 0.4 Ni/100 Co, and a precipitate is obtained on the other hand consisting of sulfides containing 300 Ni/100 Co and about 3% of the Co of the primary solution.

Such known processes are highly efficient, but they require a heating of the solutions and also the use of metals or alloys in a finely-divided form.

Moreover, the sulfides obtained as by-products in these known processes are insoluble in acids and, owing to that fact, their bringing into solution with a view to recovering the Ni and Co contained therein, can be effected only by methods employing either a preliminary roasting or an attack under pressure in an autoclave.

The present invention allows of obtaining the nickel from the primary solutions containing the nickel and cobalt, at room temperature and in the absence of finely-divided metals or alloys. Moreover, it has been found that the Ni and Co contained as a precipitate according to the present invention, have a physico-chemical structure such that they can be dissolved simply by an attack with dilute sulfuric or hydrochloric acid at normal pressure and without any preliminary roasting.

The invention consists in adding sulfides of Co, Fe, or Cu which may contain appreciable amounts of NiS to a primary solution of Ni and Co, which solution is then subjected to electrolysis at room temperature. Preferably, the solution is subjected to a strong stirring during the electrolysis.

The nickel precipitates from the solution and after separation of the insoluble matter by filtration, a cobalt-containing solution is obtained, and also a precipitate containing the nickel in the form of a sub-sulfide with a small amount of cobalt.

The primary solution may contain up to 100 Ni/100 Co, and preferably its pH is adjusted at the start to a value comprised between about 3.0 and 6.0. During the electrolysis, the pH becomes stabilized at about 6.0–6.5.

The Co, Fe or Cu sulfides added are preferably freshly obtained by a wet method. Mixture of such sulfides may be used. The sulfides may be prepared in the solution itself, for instance by adding $Na_2S$ or $(NH_4)_2S$, or CaS to the Ni/Co primary solution, or saturating this with $H_2S$ after preliminary addition of the desired amount of metal hydroxide.

The amount of sulfides added varies according to the amount of Ni which is contained in the primary solution. By way of example, it may be 0.75 mol sulfide/mol Ni in the case of a primary solution having a ratio 10 Ni/100 Co and from which it is desired to remove the nickel to about 0.5 Ni/100 Co; it may increase up to about 10 mol sulfide/mol Ni in the case of a primary solution having a ratio 0.5 Ni/100 Co and from which it is desired to remove the nickel to about 0.02 Ni/100 Co.

It is advantageous to spend the nickel-removing capacity of the sulfides by re-using them from successive precipitations of nickel from new portions of the primary solution or by a counter-current procedure.

The sulfide of Co is particularly advantageous for carrying the invention into practice.

The current density may vary within wide limits but in practice it is maintained between about 25 and about 100 a./m.$^2$. Below 25 a./m.$^2$ the duration of the process becomes too long. Above 100 a./m$^2$, the proportion of Co carried in the precipitate becomes too important.

The electrolysis is advantageously stopped when the cathodic deposition potential of cobalt has been reached (0.700 volt compared with a reference saturated KCl-calomel electrode).

The electrodes may be of any shape. It is advantageous that they shall have a maximum surface for a given volume of the cell. The electrodes may have for instance the shape of grids separated by 1 to 2 cm. from one another, or of concentric tubes through which the solution flows, or the cathode may act as the stirring means and have the shape of a plate-carrying rod, or of a turbine, etc.

The anodes may be of the soluble or insoluble type. As soluble anodes use may be made of Co or Fe or of an alloy Fe/Co. The cobalt anode is preferably used for the removal of nickel from primary solutions which do not contain other elements than Ni and Co. An iron anode may be used for instance for the removal of nickel from impure primary solutions from which iron has in any case to be removed before Co is obtained in a state of commercial purity.

As insoluble anode, Pb or graphite may be used. In such a case the catholyte is separated from the anolyte by means of a diaphragm, and the primary solution is fed to the cathode compartment, with a continuous neutralization of the solution.

The cathode may be made of a metal such as Co, Fe, Cu, Pb, or of graphite.

It should be noted that in practice no adhering deposit occurs on the cathode in the present process.

The stirring of the solution should be sufficiently strong to maintain the precipitate in suspension, whilst ensuring a continuous renewal of the suspension in the neighbourhood of the electrodes; the stirring may be obtained by any known means, for instance by a frequent renewal of the contents of the cell by means of a pump, or by means of a mechanical rotating or vibratory stirring device.

Examples (1) To one liter of a primary solution containing 30.4 grs. Co and 0.28 grs. Ni in the form of sulfates and having a pH of about 4.5, 0.75 grs. $Na_2S$ are added and the solution thus obtained is submitted to electrolysis at room temperature between a cathode of Pb and an anode of cobalt, with a current density of 25 a./m.$^2$. A strong stirring is ensured by means of a vibratory stirring device.

After the electrolysis has been effected during 65 minutes, the electrolyte is withdrawn with the precipitate in suspension; the precipitate is separated by filtration and a clear solution is obtained which analyzed 30.1 grs. Co and 0.006 grs. Ni. The ratio Ni/Co in the primary solution which was 0.28/30.4=0.92/100 has passed to 0.006/30.1=0.02/100. The precipitate separated by filtration and washed, contained 1.3 grs. Co and 0.27 grs. Ni, that is a ratio Ni/Co of about 21/100.

This precipitate is completely soluble in dilute sulfuric acid.

(2) To ten liters of a primary solution containing 58.6 grs. Co, 6.1 grs. Ni and 18.1 grs. Fe per liter in the form of sulfates and having a pH of about 5, 122 grs. of freshly precipitated CoS are added and the solution thus obtained is submitted to electrolysis at room temperature between a cathode and an anode made of iron, having the shape of grids. The current density is 40 a./m.$^2$. A strong stirring is effected by a continuous pumping with a renewal of the contents of the cell in 3 minutes. After an electrolysis lasting 50 minutes, the electrolyte is withdrawn, together with the precipitate; the precipitate is separated by filtration and a clear solution is obtained which contains per liter 64.6 grs. Co, 0.24 grs. Ni and 19.5 grs. Fe. The ratio Ni/Co which was 6.1/58.6=10.4/100 in the primary solution had passed to 0.24/64.6=0.36/100. The precipitate separated by filtration and washing contained 21 grs. Co and 58.6 grs. Ni, that is a ratio Ni/Co=280/100.

The precipitate is completely soluble in dilute sulfuric acid.

I claim:

1. A process for the separation of nickel from mixtures containing compounds of nickel and cobalt, both nickel and cobalt being contained as sulfates in a primary aqueous solution, comprising adding to the said primary solution at least one sulfide of a metal selected from the group consisting of Co, Fe and Cu, subjecting the mixture thus obtained to electrolysis at about room temperature, thus precipitating nickel, and separating the precipitate of nickel.

2. A process as claimed in claim 1, in which the anode is insoluble and in which the catholyte is separated from the anolyte by means of a diaphragm and the primary solution is fed to the cathode compartment.

3. A process for the separation of nickel from mixtures containing compounds of nickel and cobalt, both of said compounds being contained in a primary solution having a pH between 3.0 and 6.5, comprising adding to the said primary solution at least one sulfide of a metal selected from the group consisting of Co, Fe, and Cu, and in an amount which varies from a low of about 0.5 mol S/mol Ni when removing the nickel from solutions having a weight ratio of between about 50 and 100 parts of Ni/100 parts of Co, to a high of about 10 mol S/mol Ni for solutions having a weight ratio of about 0.5 part Ni/100 parts of Co and subjecting the mixture thus obtained to electrolysis with a soluble anode with strong stirring, with a current density ranging between about 25 and 100 a./m.$^2$, thus precipitating nickel, and separating the precipitate.

References Cited in the file of this patent

UNITED STATES PATENTS 514,276    Ricketts _____ Feb. 6, 1894

FOREIGN PATENTS 636,874    Great Britain _____ May 10, 1950